United States Patent [19]

Balloni et al.

[11] Patent Number: 5,346,763

[45] Date of Patent: Sep. 13, 1994

[54] MULTILAYER FILM STRUCTURE

[75] Inventors: Riccardo Balloni, Milan, Italy; M. Lawrence Tsai, Rochester, N.Y.

[73] Assignee: Mobil Oil Corporation, Fairfax, Va.

[21] Appl. No.: 51,121

[22] Filed: Apr. 21, 1993

[51] Int. Cl.$^5$ ............................................. B32B 27/08
[52] U.S. Cl. ..................... 428/349; 428/461; 428/353; 428/516; 428/520; 428/910; 428/36.6; 428/35.3
[58] Field of Search ................. 428/349, 353, 36.6, 428/35.3, 461, 463, 516, 520, 910

[56] References Cited

U.S. PATENT DOCUMENTS

| | | | |
|---|---|---|---|
| 3,433,777 | 3/1969 | Brunson | 260/88.2 |
| 4,198,327 | 4/1980 | Matsumoto et al. | 260/4 |
| 4,870,122 | 9/1989 | Lu | 524/488 |
| 5,194,318 | 3/1993 | Migliorini et al. | 428/215 |
| 5,223,346 | 6/1993 | Lu | 428/516 |

*Primary Examiner*—Edith Buffalow
*Attorney, Agent, or Firm*—Alexander J. McKillop; Malcolm D. Keen; Jessica M. Sinnott

[57] ABSTRACT

A multilayer film structure includes:
(A) a core layer of high density polyethylene including either a minor proportion of a maleic anhydride modified high density polyethylene blended therein or having
(B) a skin layer of maleic anhydride modified polyethylene on one side and
(C) on the other side a heat sealable or printable skin layer;

this structure having an unbalanced orientation such that the degree of transverse direction orientation produces a visible rippled and striated appearance, with the ripples and striations being parallel to the transverse direction of orientation. This structure can also have a layer of ethylene vinyl alcohol copolymer on the maleic anhydride modified polyethylene-containing layer. The maleic anhydride modified HDPE or the EVOH can be metallized and the final structure laminated to a separate film structure.

24 Claims, No Drawings

MULTILAYER FILM STRUCTURE

BACKGROUND OF THE INVENTION

This invention relates to a multilayer film structure which can be metallized and laminated to another film.

The structures of the present invention are employed mainly as packaging films utilized in the overwrapping of products or in the formation of bags or pouch-type containers to contain various food or non-food products. It is necessary that the film structures utilized for this purpose be as resistant to the transmission of moisture, air, deleterious flavors, etc. as possible. No single polymeric film material has the characteristics in and of itself to satisfy this requirement.

It is an object of the invention to present a multilayer film structure having the characteristics to minimize to a large extent the transmission of gases and water vapor through such a film.

SUMMARY OF THE INVENTION

In accordance with the present invention a multilayer film structure comprises:
(A) a core layer of high density polyethylene including either a minor proportion of a maleic anhydride modified high density polyethylene blended therein or having
(B) a skin layer of maleic anhydride modified polyethylene on one side and
(C) on the other side a heat sealable skin layer or a printable skin layer;
said structure having an unbalanced orientation such that the degree of transverse direction orientation produces a visible rippled striated appearance, with the appearance being parallel to the transverse direction of orientation.

The invention is also concerned with a multilayer film structure comprising:
(A) a core layer of high density polyethylene including either a minor proportion of a maleic anhydride modified high density polyethylene blended therein or having,
(B) a skin layer of maleic anhydride modified polyethylene on one side;
(C) on the other side a heat sealable skin layer or a printable skin layer; and
(D) a layer of ethylene vinyl alcohol copolymer on the maleic anhydride modified polyethylene-containing layer;
said structure having an unbalanced orientation such that the degree of transverse direction orientation produces a visible rippled and striated appearance with the appearance being parallel to the transverse direction of orientation.

In the first described multilayer film structure it is preferred that the maleic anhydride modified polyethylene containing layer contains a metallization layer thereon. In the second described multilayer structure above it is preferred that the ethylene vinyl alcohol copolymer carry a metallization layer. It is further preferred that a polymeric film is laminated to the metallized layer so as to add additional gauge, stiffness, puncture resistance, barrier preservation and various other properties to the structure.

DESCRIPTION OF THE PREFERRED EMBODIMENTS

In forming the multilayer film structures of the present invention, a core layer of high density polyethylene (HDPE), having a density 0.950 g/cc or higher is employed. A preferred density for the HDPE is about 0.96. This material will be coextruded with at least one thin skin on a surface thereof. If the maleic anhydride modified HDPE is blended with the core layer, then only one skin, i.e., the heat sealable or printable layer, will be coextruded with the core layer. When the modified polyethylene is not blended into the core layer it will be one of the coextruded skin layers. This maleated polyolefin additive may be derived from maleic acid or anhydride, copolymerized with a polyolefin such as polyethylene. The maleated polyethylene can be prepared by any process, for example, that disclosed in U.S. Pat. Nos. 3,433,777 or 4,198,327, the disclosures of which are incorporated in its entirety herein by reference. A preferred maleated polyethylene can be obtained from E.I. DuPont de Nemours Co. and sold under the tradename Bynel 4003. This material has a density of 0.951 and a melt index of 1.3. Another tie material is from Mitsui Petrochemical Industries. Inc., under the name of Admer AT754A, this is an LLDPE, density — 0.91, melt index — 2.2.

The core layer high density polyethylene is obtainable from Occidental Chemical Co. under the tradename Oxychem M6211 and has a density of 0.959, melt index — 1.1.

The ethylene vinyl alcohol (EVOH) copolymer employed herein can have an ethylene content ranging from 20–70 mole %. This material can be obtained from any commercial source. For example, extrusion grade ethylene vinyl alcohol copolymer is available under the name EVAL from Kuraray Company Ltd. of Japan. One of the materials demonstrated herein contains about 52 mole % of vinyl alcohol and 48 mole % of ethylene. EVOH resin is conventionally prepared by saponifying ethylene vinyl acetate copolymer, containing an ethylene content of 20–70 mole %, to a saponification degree 90% or higher.

The heat sealable layer employed herein and applied during coextrusion can be an ethylene propylene (EP) copolymer or an ethylene propylene butene-1 (EPB) copolymer, which will be located on the side of the substrate opposite to the EVOH layer or the maleated polyethylene layer. The ratio of ethylene to propylene to butene-1 can be from 0–15% ethylene, 70–100% propylene and 0–15% butene-1, e.g., 2% ethylene, 94% propylene and 4% butene-1, see U.S. Pat. No. 4,888,737 incorporated here by reference. The printable surface can be any polymer, such as polyolefin homopolymer, copolymer, and terpolymer, polycarbonate, polyester, etc. The characteristics of the surface include a surface free energy of 34 dynes/cm or higher.

As will be shown below in the specific examples, the first type of multilayer film structure within the scope of the present invention is formed by coextruding a three layer structure which includes a core layer of high density polyethylene with skin layers on opposite sides thereof. The first skin layer is a layer of maleic anhydride modified high density polyethylene and the other surface skin layer is a heat sealable resin consisting of an ethylene propylene butene-1 terpolymer. This structure is machine direction oriented to an extent of about 1.1 to about 2 times and thereafter, the structure is transversely oriented to an extent of about 6 to about 12 times, each at suitable orientation temperatures.

This degree of unbalanced orientation produces an interesting effect in the high density polypropylene components of the structure. The effect is a visible rippled and striated appearance with the appearance being parallel to the transverse orientation direction. Under low magnification, in each square centimeter of film there will be seen from about 5 to about 30 discontinuous undulating ripples and striations generally parallel to the direction of orientation. The effect gives the film a slight translucent appearance, which tends to slightly blur distant objects viewed through the film. This effect acts somewhat as a fingerprint indicating when the layers have been properly oriented in an unbalanced manner. The high density polyethylenes contemplated by the present invention include those disclosed in U.S. Pat. No. 4,870,122 issued to P.C. Lu, which is incorporated herein by reference in its entirety.

The following examples which also illustrate metallization directly on the maleated HDPE and directly on the EVOH copolymer is accomplished by conventional vacuum disposition. While aluminum is illustrated as the preferred metal, it is to be understood that other metals e.g., zinc, gold, silver, etc., capable of being commercially vapor deposited can also be employed. The examples which illustrate lamination of polypropylene film to the surface of the metal layer is merely by way of illustration. It is understood that other films, such as, other polyolefins, i.e., polyethylene, polybutylene, olefin copolymers, polyamides, polycarbonate, polyacrylonitrile, etc. can also be employed. In forming such laminations, an effective adhesive is a hot melt low density polyethylene applied in the amount of about 10 pounds per ream. Other suitable adhesives can also be employed.

EXAMPLE 1

A three layer biaxially oriented film, having an approximate final thickness of 1 mil, was prepared by coextruding a primary HDPE layer (density 0.96, melting point of 130° C.) comprising 90% of the film thickness and a metal receiving upper surface layer of a maleic anhydride modified HDPE (0.951), comprising 5% of the total film thickness, and a lower surface layer of heat sealable resin comprising 5% of the total thickness, of ethylene-propylene-butene-1 terpolymer. The coextrudate was quenched at between 30°-50° C., reheated to 115° C. and stretched in the machine direction 1.3 times using transport rolls operating at different speeds. After the desired machine direction orientation was obtained, the film was transversely oriented 9 times, at a temperature profile ranging from about 115°-150° C. Subsequently, the top metal receiving upper surface layer was corona discharged treated. Alternatively, this layer can be flame treated to achieve the same effect. The film was metallized with aluminum by vacuum deposition and tested for metal pick-off by Scotch 610 tape (3M Corporation). To test the metal adhesion, strips of Scotch 610 tape were applied to the metallized surface. The tape was pulled manually. The tape pull test was repeated three times with fresh tape applied to the same area.

Table 1, below, shows the film properties prior to metallization. Table 2 shows the properties after metallization.

The metallized upper layer was subsequently laminated to a layer of polypropylene film approximately 0.75 mil thick. This was adhesively bonded with 10 pounds per ream, of molten LDPE adhesive at a melt temperature of 325° C. in a laminating machine. Table 3 shows the resultant laminate properties.

EXAMPLE 2

The structure of Example 1 was repeated with minor variations and then a fourth layer, comprised of EVOH copolymer, with 48 mole % ethylene content, was applied. This was accomplished by coextruding the core HDPE layer, comprising 86% of the film thickness, with an adhesion promoting skin layer of maleic anhydride modified HDPE polymer, comprising 5% of the total film thickness, and on the opposite side a heat sealable layer comprising 5% of the total film thickness consisting of an ethylene-propylene butene-1 terpolymer. This coextrudate was quenched at between 30°-50° C., reheated to 115° C. and stretched in the machine direction 1.3 times using transport rolls operating at different speeds. After the desired machine direction orientation, the film was treated on the maleic anhydride modified HDPE side and an EVOH copolymer was extrusion coated thereon to form the fourth layer. The film was then transversely oriented 9 times on a tenter frame at a temperature profile ranging from 115°-150° C. Subsequently the EVOH polymer was corona discharge treated. This treatment was not absolutely necessary since the inherent surface free energy of EVOH is adequate for metallization.

The balance of the preparation of Example 2 is identical to Example 1 and the results are shown in the Tables below.

EXAMPLE 3

Example 2 is repeated except that the four layers are all coextruded. The core layer comprises 88% of the film thickness, the maleic anhydride modified HDPE comprises 5% of the total thickness, and on top of this layer the EVOH, with 48% ethylene content, comprises 2% of the total film thickness. The coextruded lower surface heat sealable resin, i.e., the ethylene-propylene-butene-1 terpolymer comprises 5% of the total film thickness. The structure is machine direction and transverse direction oriented as in the previous examples. The overall thickness of the film is 1.0 mil. This multilayer structure is metallized with aluminum as in Example 1 followed by lamination with polypropylene film by means of the low density polyethylene adhesive. The resultant film properties are shown in the tables below.

EXAMPLE 4

A three layer biaxially oriented film structure similar to that of Example 1 was prepared except instead of having a core layer of high density polyethylene alone the core layer was made of a blend of 85% high density polyethylene and 15% of the maleic anhydride modified HDPE. This blended core layer comprised 82% of the film thickness and coextruded on one side of this core blend was a layer of EVOH copolymer (48% ethylene content) and a lower surface layer of the heat sealable ethylene-propylene-butene-1 terpolymer. The EVOH layer comprised 2% of the total thickness of the structure and the heat sealable layer comprised 16% of the total film thickness. This structure was biaxially oriented to the unbalanced extend as shown in Example 1. This structure was then metallized with aluminum as in Example 1 and thereafter the metallized surface was laminated to polypropylene employing the low density polyethylene as described in Example 1. The characteristics of these structures are shown in Tables 1, 2 and 3 below.

In Tables 2 and 3 under the heading "Aroma Barrier" there is an indication as to whether or not the film samples are an effective barrier to aromas. In order to test the effectiveness of the films in excluding deleterious odors, flavors and aromas from a product susceptible of absorbing such flavors, etc., several packages were wrapped and sealed in the film. All of the packages were placed in a controlled environment which exposed them to an aromatic hydrocarbon that provided a typical or potential odorant that can be readily identified chemically and measured quantitatively. In this case the aromatic hydrocarbon was toluene. Individual packages were withdrawn from the controlled environment in a timed sequence. A small air sample was then taken from within the package with a hypodermic syringe. The sample was analyzed chromatographically. The chromatographic peak stayed low as time progressed and raised only slowly at longer times. The test was carried out over a time period of from 0–200 hrs. This revealed that the subject multilayer structure is an excellent odor, flavor and aroma barrier that can be used to protect flavor sensitive products.

TABLE 1

| | Film Properties Prior to Metallization | | | |
|---|---|---|---|---|
| EXAMPLE | TREATMENT LEVEL DYNES/CM | HAZE | WATER VAPOR TRANS* | OXYGEN TRANS** |
| 1 | 40 | 7 | 0.22 | 105 |
| 2 | >56 | 5.8 | 0.25 | 5 |
| 3 | >56 | 6.6 | 0.25 | 15 |
| 4 | >56 | 6.8 | 0.28 | 15 |

*g/100 in.$^2$/24 hrs.
**cc/100 in.$^2$/24 hrs.

TABLE 2

| | Film Properties After Metallization | | | |
|---|---|---|---|---|
| EXAMPLE | LIGHT TRANSMIS | WATER VAPOR TRANS | OXYGEN TRANS | AROMA BARRIER |
| 1 | <1% | 0.20 | 42 | No |
| 2 | <1% | 0.008 | 0.009 | Yes |
| 3 | <1% | 0.02 | 0.015 | Yes |
| 4 | <1% | 0.02 | 0.02 | Yes |

TABLE 3

| | Film Properties After Lamination | | | |
|---|---|---|---|---|
| EXAMPLE | LIGHT TRANSMIS | WATER VAPOR TRANS* | OXYGEN TRANS** | AROMA BARRIER |
| 1 | <1% | 0.13 | 42 | No |
| 2 | <1% | 0.008 | 0.009 | Yes |
| 3 | <1% | 0.02 | 0.015 | Yes |
| 4 | <1% | 0.02 | 0.01 | Yes |

Table 1 shows that Example 1 is an effective water vapor transmission barrier film in that it permitted only 0.22 grams/ 100 in.$^2$/24 hrs. Example 2 shows that the addition of EVOH copolymer dramatically dropped the amount of oxygen transmitted in comparison to Example 1. Example 3 shows that the EVOH applied as a coextruded layer rather than as an extrusion coated layer is virtually as effective in reducing the amount of oxygen transmission. Example 4 shows that employing a blend of the high density polyethylene and the maleic anhydride modified high density polyethylene produces an effective multilayer structure as far as water vapor and oxygen transmission are concerned.

Table 2 shows that after Example 1 has been metallized with aluminum the oxygen transmission amount in 24 hrs. dropped dramatically from 105 cc to 42 cc. The water vapor transmission decreased slightly. Example 2 shows an outstanding decrease in the amount of water vapor transmission in 24 hrs., i.e. a drop from 0.2 grams/100 in.$^2$ in 24 hrs. to 0.008g/100 in.$^2$ in 24 hrs. In addition, the oxygen transmission dropped from 42 cc per 100 in.$^2$ per 24 hrs. to 0.009 ccs. Example 3 shows that the manner of depositing the EVOH copolymer does not make a great deal of difference in the effectiveness of the barrier film. Example 4 which utilizes a blend as the core layer illustrates that this produces a very effective barrier multilayer structure. Examples 2, 3 and 4 of Table 2 shows that the multilayer structure is an effective aroma barrier.

Table 3 shows that when Example 1 is laminated to the oriented polypropylene film there is a significant drop in water vapor and oxygen transmission barrier characteristics but that the film is not an effective aroma barrier. Examples 2, 3 and 4 illustrate an effective decrease in the water vapor and oxygen transmission barrier characteristics and in addition the structures of Examples 2, 3 and 4 are effective aroma barrier films. The structure of the present invention provide excellent hermetic seals when formed into pouches or other containers.

Although the present invention has been described with preferred embodiments, it is to be understood that modifications and variations may be resorted to without departing from the spirit and scope of this invention as those skilled in the art would readily understand. Such variations and modifications are considered to be within the purview and scope of the appended claims.

What is claimed is:

1. A multilayer film structure comprising:
   (A) a core layer of high density polyethylene including either a minor proportion of a maleic anhydride modified high density polyethylene blended therein or having
   (B) a skin layer of maleic anhydride modified polyethylene on one side and
   (C) on the other side a heat sealable or a printable skin layer;
   said structure having an unbalanced orientation such that the degree of transverse direction orientation produces a visible rippled and striated appearance with the appearance being parallel to the transverse direction of orientation.

2. The structure of claim 1 wherein said ripples and striations are visible in the polyethylene components thereof.

3. The structure of claim 2 wherein the maleic anhydride modified polyethylene-containing layer carries a metallization layer thereon.

4. The structure of claim 3 wherein said metallization layer is aluminum.

5. The structure of claim 3 wherein the maleic anhydride modified polyethylene layer has been treated to a surface free energy of greater than 33 dynes/cm before metallization.

6. The structure of claim 5 wherein the maleic anhydride modified polyethylene layer has been treated by corona discharge or by flame treatment.

7. The structure of claim 4 wherein said aluminum layer reveals at least some of the rippled and striation visual pattern of claim 1.

8. The structure of claim 3 wherein a polymeric film is laminated to the metallization layer, said polymeric film adding additional gauge, stiffness, puncture resistance and barrier properties to said structure.

9. The structure of claim 8 wherein said polymeric film is oriented or unoriented, transparent or opaque polyolefin.

10. The structure of claim 9 wherein said heat sealable skin layer is an olefin homopolymer, copolymer, or terpolymer.

11. The structure of claim 10 wherein said terpolymer is an ethylene/propylene/butene-1 terpolymer.

12. The structure of claim 11 wherein core layer (A) is a blend of a high density polyethylene and a minor proportion of a maleic anhydride modified high density polyethylene.

13. The structure of claim 11 wherein (A) is a core layer of high density polyethylene and (B) is a skin layer thereon of maleic anhydride modified polyethylene.

14. A multilayer film structure comprising:
(A) a core layer of high density polyethylene including either a minor proportion of a maleic anhydride modified high density polyethylene blended therein or having
(B) a skin layer of maleic anhydride modified polyethylene on one side and
(C) on the other side, a heat sealable or printable skin layer; and
(D) a layer of ethylene vinyl alcohol copolymer on the maleic anhydride modified polyethylene-containing layer; said structure having an unbalanced orientation such that the degree of transverse direction orientation produces a visible rippled and striated appearance with the ripples and striations being parallel to the transverse direction of orientation.

15. The structure of claim 14 wherein said ripples and striations are visible in the polyethylene components thereof.

16. The structure of claim 15 wherein the ethylene vinyl alcohol copolymer layer carries a metallization layer thereon.

17. The structure of claim 16 wherein said metallization layer is aluminum.

18. The structure of claim 17 wherein said ethylene vinyl alcohol copolymer is a corona discharge treated or a flame treated surface.

19. The structure of claim 17 wherein said aluminum layer reveals at least some of the ripples and striation visual pattern of claim 14.

20. The structure of claim 16 wherein a polymeric film is laminated to the metallization layer, said polymeric film adding additional gauge, stiffness, puncture resistance and barrier properties to said structure.

21. The structure of claim 20 wherein said polymeric film is oriented or unoriented, transparent or opaque.

22. The structure of claim 21 wherein said lamination is accomplished by way of a low density polyethylene adhesive.

23. The structure of claim 22 wherein said heat sealable skin layer is an olefin homopolymer, copolymer, or terpolymer.

24. The structure of claim 23 wherein said terpolymer is an ethylene/propylene/butene-1 terpolymer.

* * * * *